United States Patent [19]
Mann et al.

[11] Patent Number: 6,006,696
[45] Date of Patent: Dec. 28, 1999

[54] CLAM SHELL STYLE LARGE HAY BALE FEEDING APPARATUS

[76] Inventors: Fred W. Mann, Box 444; Kerwin W. Mann, 119 E. Railroad St., both of Waterville, Kans. 66548

[21] Appl. No.: 08/950,560

[22] Filed: Oct. 15, 1997

[51] Int. Cl.⁶ ........................................ A01K 1/10
[52] U.S. Cl. ............................................... 119/60
[58] Field of Search ........................... 119/58, 60

[56] References Cited

U.S. PATENT DOCUMENTS

| | | | |
|---|---|---|---|
| 1,592,493 | 7/1926 | Kelly | 119/60 |
| 3,802,394 | 4/1974 | Mahler | 119/60 X |
| 4,722,302 | 2/1988 | Gee, Jr. | |
| 4,930,449 | 6/1990 | Harton | |
| 5,311,840 | 5/1994 | Rumbaugh | |
| 5,337,699 | 8/1994 | Dyson | |
| 5,496,145 | 3/1996 | Monin | 414/24.5 |
| 5,509,377 | 4/1996 | Franklin | 119/60 |

FOREIGN PATENT DOCUMENTS

| | | | |
|---|---|---|---|
| 2598281 | 11/1987 | France | 119/60 |

*Primary Examiner*—Robert P. Swiatek
*Attorney, Agent, or Firm*—Litman, Kraai & Brown L.L.C.

[57] ABSTRACT

A clam shell style large hay bale feeder includes a rectangular frame supporting a bale holding clam shell structure with two opposing sides formed by respective sets of steel straps. The sides are attached to the support frame such that they can fold inward and outward within the frame. Each adjacent pair of straps is spaced apart a distance sufficient to form a livestock feeding station. The clam shell structure folds inward about a hay bale placed in it such that the bale is always securely clamped in the clam shell and such that feeding livestock have constant access to the perimeter of the bale as it diminishes in size. A number of different operating mechanisms are described which serve to reopen the clam shell after the bale is consumed.

15 Claims, 3 Drawing Sheets

CLAM SHELL STYLE LARGE HAY BALE FEEDING APPARATUS

BACKGROUND OF THE INVENTION

I. Field of the Invention

The present invention relates to an apparatus which holds a large hay bale for feeding livestock and, in particular, to an apparatus for holding the large hay bale while allowing livestock access to the bale as it shrinks in size during feeding. The apparatus includes a clam shell structure which folds inward around the bale as it decreases in size to securely hold the bale, yet provides continuous access to the bale by feeding cattle.

II. Description of the Related Art

Prior art large bale feeders have generally included some type of bale holding cradle which is accessible by livestock from one or more sides of the feeder. In most such feeders, the bale holding cradle is fixed in size which means that, as the hay bale shrinks during feeding, access to the bale by feeding livestock may be interrupted. This can result in wasted hay and also in damage to the feeder as cattle push against the feeder in an effort to reach the shrinking bale.

Numerous attempts have been made to address the problem of wasted hay in bale feeders. One example is U.S. Pat. No. 5,311,840 to Earnest Rumbaugh, which teaches a bale cradle spaced from feeding cattle by a bar framework such that cattle can reach the bale but hay dropped by feeding cattle falls into a protected area which the cattle can also reach. The cradle is fixed in size and position in the Rumbaugh patent.

Another example of a hay saving feeder is that of U.S. Pat. No. 5,337,699 to Dyson, directed to a cylindrical hay bale feeder which accommodates a round bale standing on end. A number of bale centering springs are positioned on the cylindrical sidewalls and extend inward to hold the hay bale a predetermined distance from the feeding cattle. Again, the Dyson patent does not make any allowance for cattle to reach a shrinking hay bale.

Attempts have been made to accommodate a shrinking hay bale. Both U.S. Pat. No. 4,722,302 to Gee, Jr. and U.S. Pat. No. 4,930,449 to Harton show variations of a rectangular cage for holding a hay bale. In both patents the cages have side panel grids which are movable toward the center of the cage as feeding cattle push on them to allow feeding cattle access to a shrinking hay bale. A problem with both the Gee, Jr. and Harton patents is the requirement for cattle to actively push on the feeder side panels in order to move them inward toward the shrinking bale. Furthermore, the mechanisms which allow the sides of the feeder to move toward each other are somewhat complex and prone to lock up if they get cluttered or dirty.

It is clear then, that a need still exists for a large hay bale livestock feeder which allows feeding cattle to easily and efficiently reach a shrinking hay bale. Such a feeder should also act as a hay saver by preventing hay pulled from the bale from being trampled and wasted. Finally, such a feeder should make it easy to load a large bale into it or unload a large bale from it.

SUMMARY OF THE INVENTION

A clam shell style large hay bale feeder includes a rectangular support frame including four vertical corner posts. A front and a rear grid structure are attached between two respective pairs of the corner posts to provide rigidity. A bale holding clam shell structure is formed by two opposing sets of spring steel straps, each attached between respective ones of an uppermost and a lowermost pair of rigid steel rods or pipes with each adjacent pair of straps being spaced apart a distance sufficient to allow a cow's muzzle to fit between them to form a number of feeding stations on either side of the feeder. The lowermost steel pipes of the clam shell structure are pivotably attached between a pair of brackets, each of which is slidable between two center supports in a respective one of the front or rear grids. The uppermost steel pipes of the clam shell structure are attached to the support frame by four rigid steel pivot rods, each of which is pivotably attached to a respective one of the corner posts. In a first embodiment of bale feeder, a cable is attached to one of the brackets and a winch is provided to winch the cable and the attached bracket upward which serves to open the clam shell to receive a hay bale. The winch is then latched in position. Once the bale is positioned on the clam shell, the winch is released and the weight of the bale forces the center of the clam shell structure and the attached brackets downward until the bale is gripped between the two halves of the clam shell. As the bale diminishes in size due to livestock feeding, the center of the clam shell continues to drop further, bringing in the sides of the clam shell structure further. The clam shell structure thus continuously grips the bale and allows feeding livestock to move inward from the sides of the feeder to better reach the shrinking bale. Once the bale is fully consumed, the winch is again operated to raise the brackets and reopen the clam shell structure. In a second embodiment, a cable is attached to one of the brackets and extends upward over a pulley positioned atop either the front or rear grid structure. A counterweight is attached to the cable such that the counterweight will automatically raise the bracket and the attached center of the clam shell structure when the bale is consumed. In a third embodiment, a cable is attached to each bracket and each cable extends upward and over a respective pulley positioned atop the front or rear grid on the support frame. A spring is positioned beneath the clam shell structure with either end of the spring attached to an end of a respective one of the cables. The spring exerts a downward force on each cable which is translated to an upward force on the brackets, thus serving to automatically open the clam shell structure when the bale is consumed. In a variation of the third embodiment, a pair of springs can be provided with one spring attached to each respective cable.

PRINCIPAL OBJECTS AND ADVANTAGES OF THE INVENTION

Therefore, the principal objects and advantages of the present invention include: providing an improved clam shell style large hay bale feeder; providing such a feeder in which a clam shell structure is provided for receiving a large hay bale; providing such a feeder in which the clam shell structure also functions as a number of feeding stations; providing such a feeder in which the clam shell structure securely grips the large hay bale; providing such a feeder in which the clam shell automatically folds inward around the bale as it shrinks during consumption by feeding livestock; providing such a feeder in which the folding inward of the clam shell structure allows the feeding livestock continuous access to the shrinking bale; providing such a feeder in which the clam shell structure can be reopened to receive another bale after the current bale is fully consumed; and providing such a feeder which is efficient and reliable, economical to manufacture, simple to maintain, and which is particularly well suited to its intended purpose.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
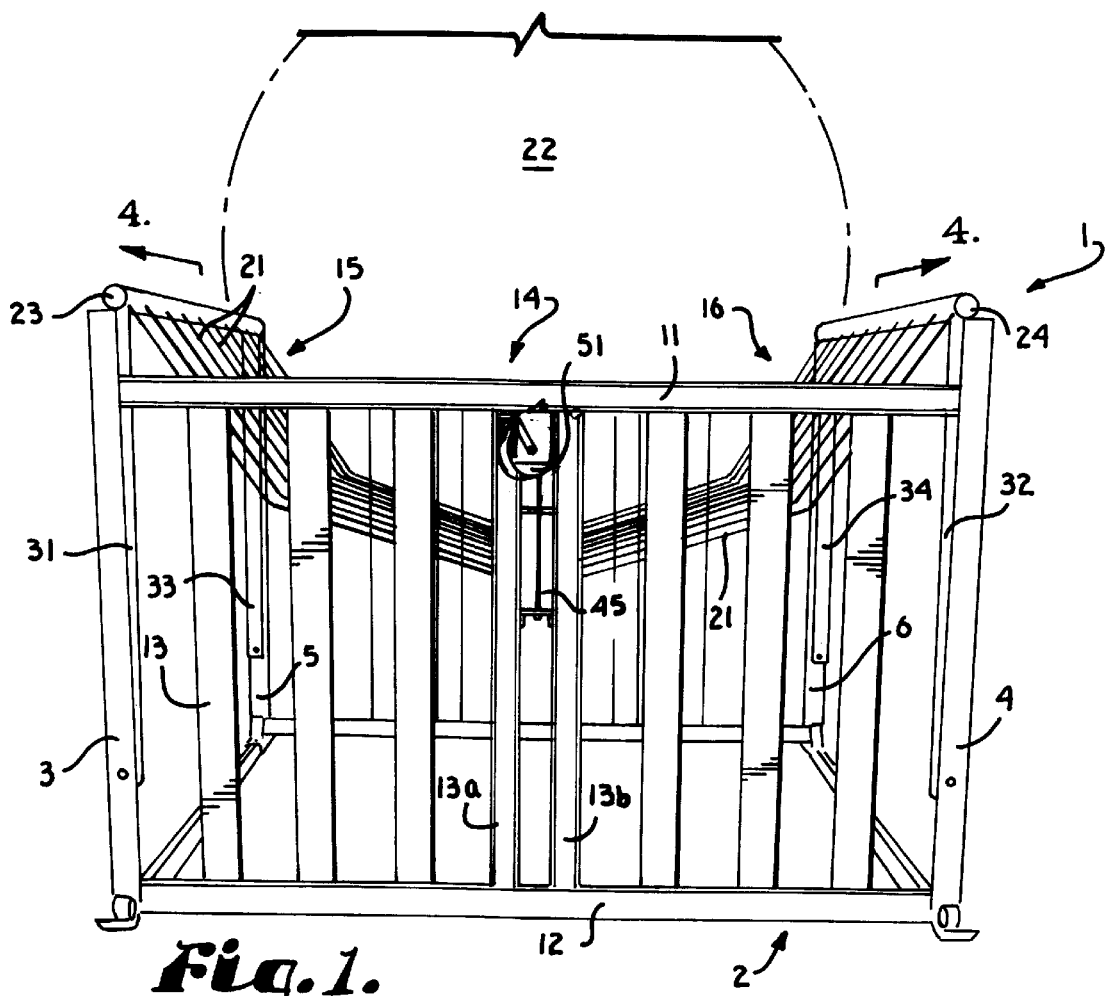
FIG. 1 is a frontal perspective view of the clam shell hay bale feeder in accordance with the present invention.
Figure 2:
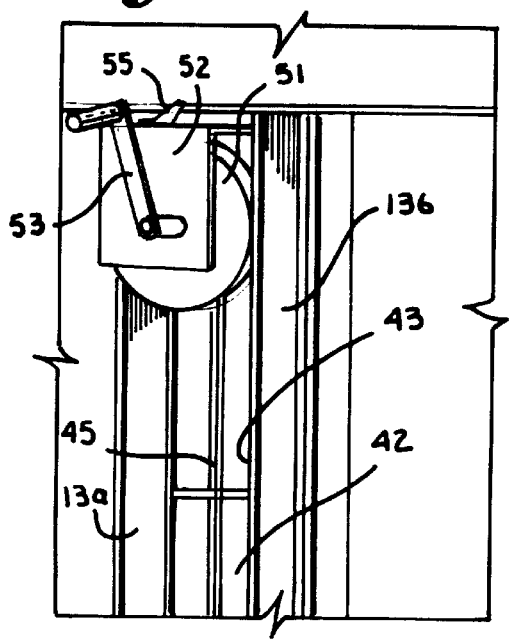
FIG. 2 is an enlarged, fragmentary view of a portion of a first embodiment of the feeder, showing a winch and cable for reopening the clam shell structure.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "front", "rear", "right" and "left" will refer to directions in the drawings to which reference is made.

Referring to the drawings in more detail the reference numeral 1 in FIG. 1 generally refers to a clam shell style large hay bale feeder which includes a rectangular support frame 2 with four vertical corner posts 3–6. A front grid structure includes top and bottom cross bars 11 and 12 extending between the front corner posts 3 and 4 and a plurality of vertical supports 13 are attached between the top and bottom cross bars 3 and 4, including a pair of middle vertical supports 13a and 13b. A matching rear grid structure with identical components is attached between the rear corner posts 5 and 6.

A bale holding clam shell structure, generally indicated at 14, is formed by two opposing sets 15 and 16, respectively, of spring steel straps 21 with each adjacent pair of straps 21 being spaced apart a distance sufficient to form an individual feeding station such that a cow's muzzle fits between them to reach a hay bale, such as the bale 22. The spacing between the steel straps 21 is preferably no larger than 8 inches. The clam shell structure 14 also includes four elongate rigid steel rods or pipes 23–26 including an uppermost pair 23 and 24 and an lowermost pair 25 and 26. The uppermost pair of steel pipes 23 and 24 have an outer terminal end of each strap 21 in a respective one of the sets of straps 15 and 16 attached thereto. The lowermost pair of steel pipes 25 and 26 have an inner terminal end of each strap 21 in a respective one of the sets of straps 15 and 16 attached thereto. Four rigid steel pivot supports 31–34 are provided to attach the clam shell structure to the support frame. Each steel pivot support 31–34 is pivotably attached at a bottom end thereof to a respective one of the corner posts 3–6. Each steel pivot support 31–34 is rigidly attached at an upper end to one of the uppermost steel pipes 23 and 24 near a respective outer end thereof.

A pair of generally rectangular brackets 41 are attached to respective ends of both of the lowermost steel pipes 25 and 26 such that the steel pipes 25 and 26 are positioned proximate to each other and each pipe 25 and 26 can freely rotate relative to the brackets 41. Each bracket 41 has an outer portion 42 which is sized to be received in a slot 43 formed between the middle vertical supports 13a and 13b of either the front or rear grid structure such that the brackets 41 can slide upward and downward vertically within the slot 43.

Figure 4:
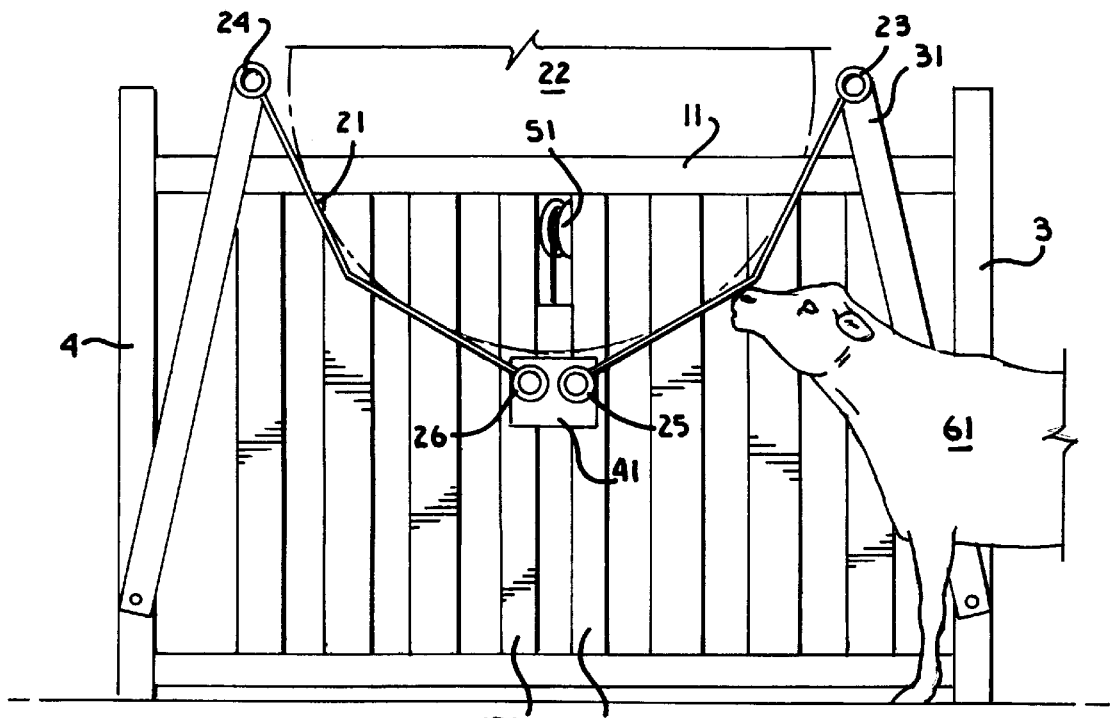
FIG. 4 is a cross sectional view of the feeder, taken along line 4—4 of FIG. 1 and showing the winch released to allow the clam shell structure to partially fold inward and grip a large hay bale and with a cow shown feeding on the full sized bale.

The components described above are universal to all of the embodiments of the inventive clam shell style feeder 1. The embodiments diverge in the method and apparatus provided to reopen the clam shell structure 14. Referring to FIGS. 1, 2, 4 and 5, in a first embodiment a cable 45 is attached to an outer side of the front bracket 41 with the cable 45 being wound onto a winch 51 which is attached near an upper end of the front grid structure via a winch mounting plate 52. The winch 51 includes a conventional handle 53 used to wind the cable 45 onto the winch 51 and a ratcheting latch 55 is provided to lock the winch 51 in a selected position. In operation, in the first feeder embodiment, the winch handle 53 is first wound to retrieve the cable 45 onto the reel 54 until the center of the clam shell structure 14 is raised upward to the open position shown in FIG. 1 and the winch latch 55 is engaged. The hay bale 22 is then placed into the clam shell structure 14 and the winch latch 55 is released. This allows the brackets 41 to drop within the slots 43, thus allowing the steel straps 21 of the clam shell 14 to tighten about the bale 22 as the weight of the bale 22 pushes the lowermost steel pipes 25 and 26 downward, pushing the attached brackets 41 downward within the slots 43 and drawing the pivoting pivot supports 31–34 inward, as shown in FIG. 4. As the bale 22 shrinks in size due to feeding livestock, such as the cow 61, the brackets 41 gradually drop further within the slots 43, further tightening the steel straps 21 about the bale 22 and allowing the feeding cow 61 to move inward to gain continuous feeding access to the perimeter of the shrinking bale 22. When the bale 22 is completely consumed, the winch handle 53 is again operated to reopen the clam shell 14 and the winch latch 55 is again set to retain the clam shell 14 in the open position until another hay bale is placed thereon.

Figure 3:
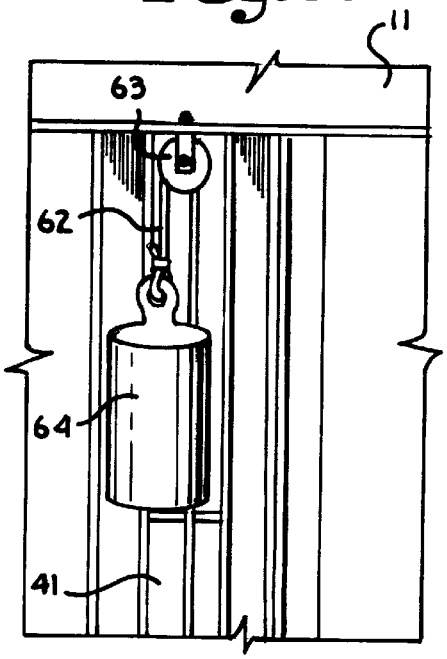
FIG. 3 is an enlarged, fragmentary view of a portion of a second embodiment of the feeder, showing a counterweight and cable for reopening the clam shell structure.
Figure 5:
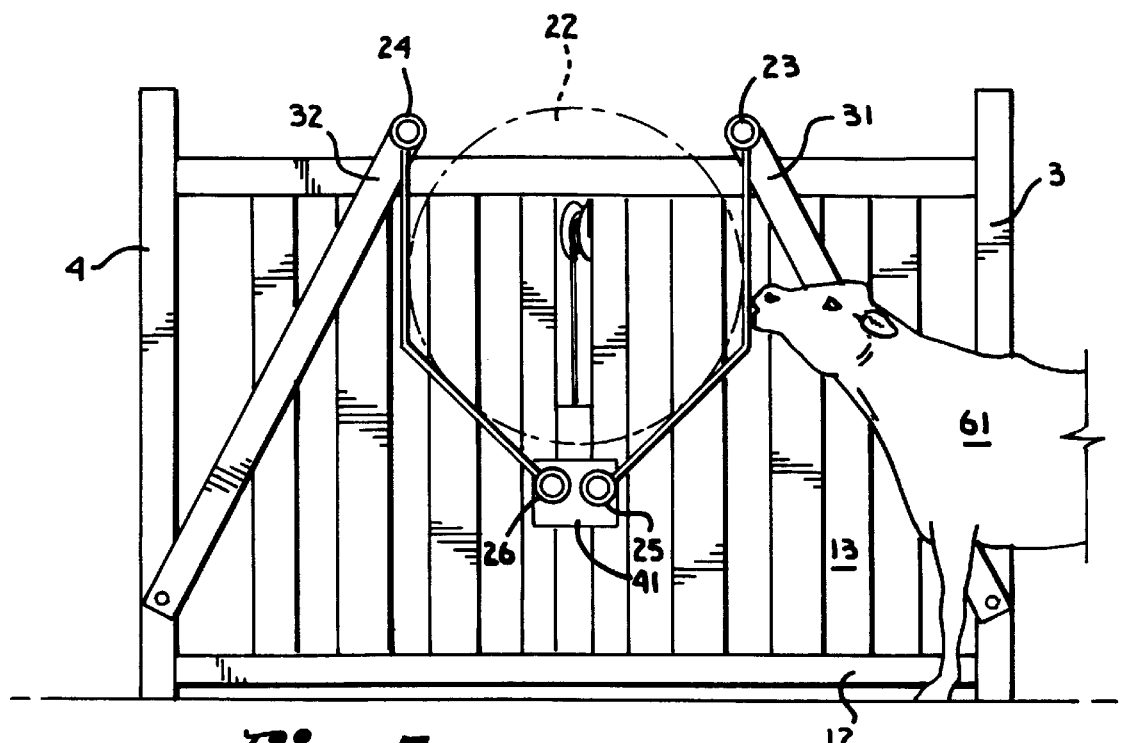
FIG. 5 is a cross sectional view of the feeder, taken along line 4—4 of FIG. 1, showing the clam shell structure continuing to fold inward about a shrinking bale and with the cow moving in closer to feed on the smaller bale.

Referring to FIG. 3, a second embodiment of the feeder 1 includes a cable 62 attached to the front bracket 41 and extending upward and over a pulley 63 which is attached beneath the top cross bar 11. A terminal end of the cable 62 is attached to a counterweight 64. The pulley 63 and the counterweight 64 essentially replace the winch 51 of FIG. 2 such that the weight of the hay bale 22 counteracts the weight of the counterweight 64 to allow the clam shell structure 14 to tighten about the bale 22 in the same fashion as shown in FIGS. 4 and 5. When the bale 22 is completely, or substantially consumed, the weight of the counterweight 64 pulls the bracket 41 upward, thus automatically reopening the clam shell structure 14 to a position for receiving the next hay bale.

Figure 6:
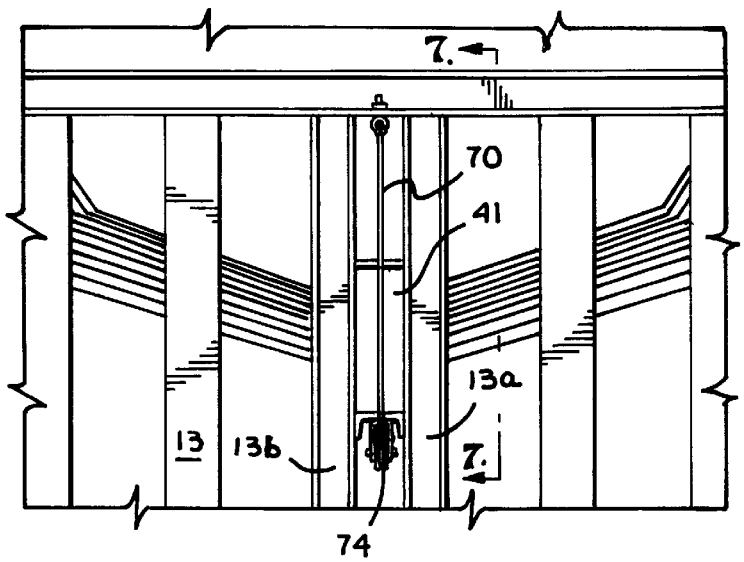
FIG. 6 is an enlarged, fragmentary front elevational view of a third embodiment of the feeder, showing a spring connecting a pair of cables for automatically reopening the clam shell structure.
Figure 7:
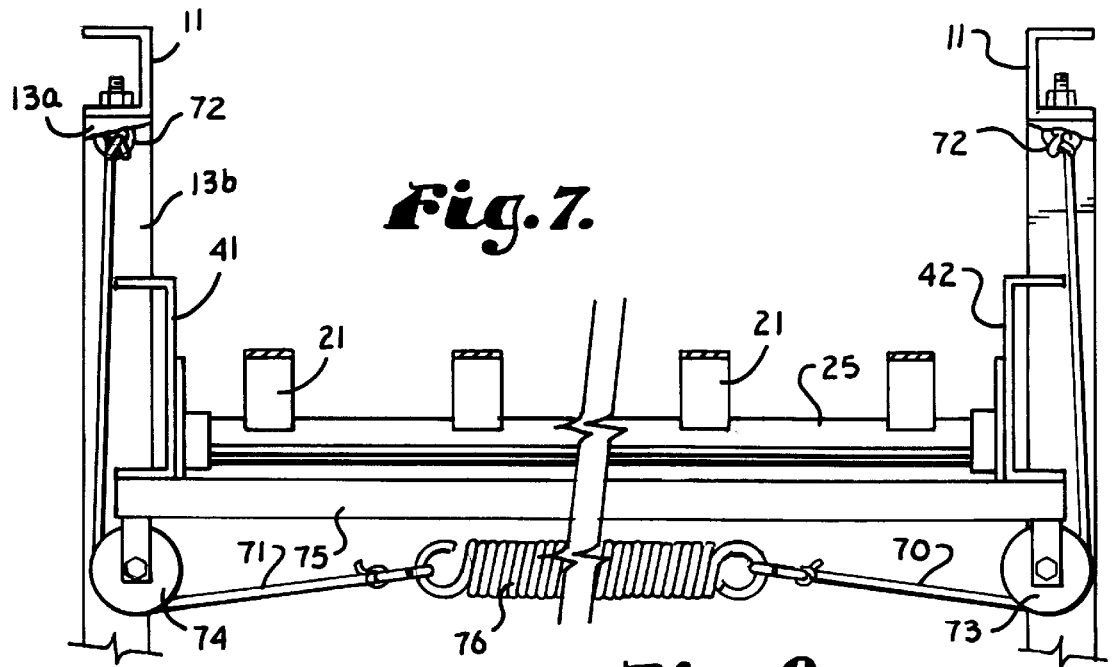
FIG. 7 is a fragmentary, cross sectional view of a portion of the third embodiment of the feeder, taken along line 7—7 of FIG. 6.

FIGS. 6 and 7 illustrate a third embodiment of the feeder 1, includes a pair of cables 70 and 71, each with an upper terminal end attached to a respective one of the front or rear cross bars 11 via a respective one of a pair of eyelets 72. The cables 70 and 71 extend downward and around respective pulleys 73 and 74 which are attached beneath respective opposite ends of a clam shell structure cross bar 75 extending between the brackets 41. From the pulleys 73 and 74, the cables 70 and 71 extend inward beneath the brackets 41 and are attached to respective opposite ends of a coil spring 76. Here the pulleys 73 and 74 and the spring 76 essentially replace the winch 51 of FIG. 2 such that the weight of the hay bale 22 counteracts the action of the spring 76 to allow the clam shell structure 14 to fold inward about the bale 22 in the same fashion as shown in FIGS. 4 and 5. When the bale 22 is completely, or substantially consumed, the tension provided by the spring 76 counters the weight of the empty clam shell structure 14, pulling the cables 70 and 71 inward, thus forcing the brackets 41 upward and automatically reopening the clam shell structure 14 to a position for receiving the next hay bale.

Figure 8:
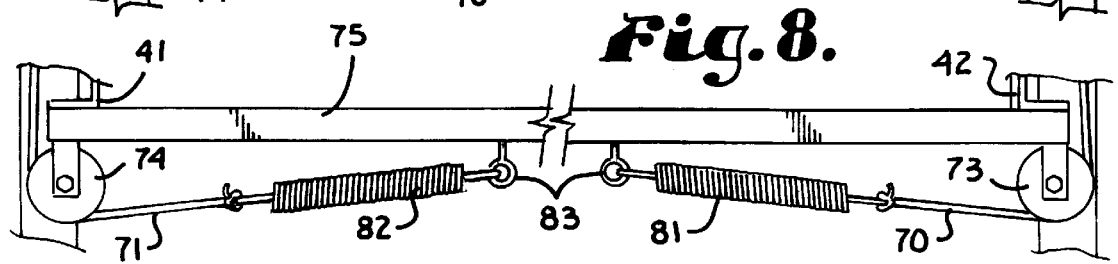
FIG. 8 is a fragmentary, cross sectional view of the feeder, again taken along the line 7—7 of FIG. 6 and showing a variation of the third embodiment of the feeder, with two springs provided to automatically reopen the clam shell structure.

FIG. 8 illustrates a variation on the third embodiment of the feeder 1, with a pair of springs 81 and 82 positioned beneath the clam shell structure 14 with each spring 81 and 82 attached beneath the cross bar 75 near the center thereof. The springs 81 and 82 extend in opposite directions from a pair of eyelets 83 and are attached to respective ones of the cables 70 and 71. In the arrangement of FIG. 8, each spring 81 and 82 exerts an inward force on a respective one of the cables 70 and 71, thus exerting upward pressure on the brackets 41 and serving to reopen the clam shell structure 14 when the bale 22 is substantially consumed.

It is to be understood that while certain forms of the present invention have been illustrated and described herein, it is not to be limited to the specific forms or arrangement of parts described and shown.

I claim:

1. A clam shell style large hay bale feeder comprising:
   a. a support frame with a front and a rear spaced apart sufficiently to accommodate a large hay bale positioned longitudinally therebetween; and
   b. a clam shell structure positioned within said support frame to receive the longitudinally positioned large hay bale, said clam shell structure comprising a pair of opposing sides with respective lowermost ends positioned proximate each other and respective uppermost ends, said lowermost ends each being pivotably mounted on a pair of common vertically movable brackets such that, when said brackets move downward, said uppermost ends are pivoted toward each other and when said brackets move upward, said uppermost ends are pivoted away from each other such that said clam shell structure can fold inward around the hay bale.

2. A clam shell style large hay bale feeder as in claim 1, and further comprising:
   a. four corner posts in said support frame; and
   b. said clam shell structure further comprises:
      i. first and second elongate rigid members respectively forming said uppermost ends of said opposing sides; and
      ii. four rigid pivot supports with each said pivot support being pivotably attached near a lower end to a respective one of said corner posts and with each pivot support being attached at an upper end near a respective corner of one of said first or second elongate rigid members.

3. A clam shell style large hay bale feeder as in claim 2, and further comprising:
   a. at least two substantially vertical supports in each of said support frame front and said support frame rear, said substantially vertical supports being separated a predetermined distance; and
   b. said clam shell structure further comprises:
      i. third and fourth elongate rigid members respectively forming said lowermost ends of said opposing sides; and
      ii. a respective end of each of said third and fourth elongate rigid members being pivotably attached to each said bracket in said pair of common vertically movable brackets, each bracket being positioned to slide vertically along the substantially vertical supports of a respective one of the front or rear sides of said support frame as said elongate rigid members pivot in said brackets.

4. A clam shell style large hay bale feeder as in claim 1, and further comprising:
   a. said brackets in said lair of common vertically movable brackets being slidable vertically downward relative to said support frame as said uppermost ends of said clam shell structure move inward and said brackets being slidable vertically upward relative to said support frame as said uppermost ends of said clam shell structure move outward;
   b. a winch mounted on said support frame; and
   c. a cable attached to one of said brackets in said pair of common vertically movable brackets and extending to said winch.

5. A clam shell style large hay bale feeder as in claim 1, and further comprising:
   a. said brackets in said pair of common vertically movable brackets being slidable vertically downward relative to said support frame as said uppermost ends of said clam shell structure move inward and said brackets being slidable vertically upward relative to said support frame as said uppermost ends of said clam shell structure move outward;
   b. a cable attached to one of said brackets in said pair of common vertically movable brackets and extending upward therefrom and over a pulley attached to said support frame; and
   c. a counterweight attached to said cable.

6. A clam shell style large hay bale feeder as in claim 1, and further comprising:
   a. said brackets in said pair of common vertically movable brackets being slidable vertically downward relative to said support frame as said uppermost ends of said clam shell structure move inward and said brackets being slidable vertically upward relative to said support frame as said uppermost ends of said clam shell structure move outward;

b. a cable with one end attached to said support frame; and c. a spring attached to an opposite end of said cable at one end such that a force acting on said cable by said spring tends to force said brackets in said pair of common vertically movable brackets upward.

7. A clam shell style large hay bale feeder as in claim 1, wherein each of said opposing sides of said clam shell structure includes a plurality of dividers, each of which extends from said lowermost end to said uppermost end, said dividers being spaced along the respective sides and each adjacent pair of dividers being spaced apart a distance sufficient to serve as a livestock feeding station.

8. A clam shell style large hay bale feeder comprising:

a. a support frame with a front and a rear spaced apart sufficiently to accommodate a large hay bale positioned longitudinally therebetween, said support frame front and rear each being framed by a respective pair of corner posts; and b. a clam shell structure positioned within said support frame to receive the longitudinally positioned large hay bale, said clam shell structure comprising:

i. a pair of opposing sides with respective lowermost ends positioned proximate each other and respective uppermost ends, said lowermost ends being pivotably mounted such that said uppermost ends are movable toward and away from each other;

ii. first and second elongate rigid members respectively forming said uppermost ends of said opposing sides; and iii. four rigid pivot supports with each pivot support being pivotably attached near a lower end to a respective one of said corner posts and with each pivot support being attached at an upper end near a respective end of one of said first or second elongate rigid members.

9. A clam shell style large hay bale feeder as in claim 8, and further comprising:

a. at least two substantially vertical supports in each of said support frame front and said support frame rear, said substantially vertical supports being separated a predetermined distance; and b. said clam shell structure further comprises:

i. third and fourth elongate rigid members respectively forming said lowermost ends of said opposing sides; and ii. a pair of brackets, a respective end of each of said third and fourth elongate rigid members being pivotably attached to each bracket, each said bracket being slidable vertically downward along a slot formed between a respective pair of said substantially vertical supports as said uppermost ends of said clam shell structure move inward and each said bracket being slidable vertically upward along said slot as said uppermost ends of said clam shell structure move outward.

10. A clam shell style large hay bale feeder as in claim 9, and further comprising:

a. a winch mounted on said support frame; and b. a cable attached to one of said brackets and to said winch.

11. A clam shell style large hay bale feeder as in claim 9, and further comprising:

a. a cable attached to one of said brackets and extending upward therefrom and over a pulley attached to said support frame; and b. a counterweight attached to said cable.

12. A clam shell style large hay bale feeder as in claim 9, and further comprising:

a. a cable with one end attached to said support frame; and b. a spring attached to an opposite end of said cable at one end such that a force acting on said cable by said spring tends to force said brackets upward.

13. A clam shell style large hay bale feeder as in claim 8, wherein each of said opposing sides of said clam shell structure includes a plurality of dividers, each of which extends from said lowermost end to said uppermost end, said dividers being spaced along the respective sides and each adjacent pair of dividers being spaced apart a distance sufficient to serve as a livestock feeding station.

14. A clam shell style large hay bale feeder comprising:

a. a support frame with a front grid and a rear grid spaced apart sufficiently to accommodate a large hay bale positioned longitudinally therebetween, said support frame front grid and rear grid each being framed by a respective pair of corner posts and including at least two substantially vertical supports, said substantially vertical supports being separated a predetermined distance to form a slot therebetween; and b. a clam shell structure positioned within said support frame to receive the longitudinally positioned large hay bale, said clam shell structure comprising:

i. a pair of opposing sides with respective lowermost ends positioned proximate each other and respective uppermost ends;

ii. first and second elongate rigid members respectively forming said uppermost ends of said opposing sides;

iii. four rigid pivot supports with each pivot support being pivotably attached near a lower end to a respective one of said corner posts and with each pivot support being attached at an upper end near a respective end of one of said first or second elongate rigid members;

iv. third and fourth elongate rigid members respectively forming said lowermost ends of said opposing sides; and v. a pair of brackets, a respective end of each of said third and fourth elongate rigid members being pivotably attached to each bracket such that said uppermost ends are movable inward toward and outward away from each other, each said bracket being slidable vertically downward along a respective one of said slots as said uppermost ends of said clam shell structure move inward and each said bracket being slidable vertically upward along said respective slot as said uppermost ends of said clam shell structure move outward.

15. A clam shell style large hay bale feeder as in claim 14, wherein each of said opposing sides of said clam shell structure includes a plurality of dividers, each of which extends from said lowermost end to said uppermost end, said dividers being spaced along the respective sides and each adjacent pair of dividers being spaced apart a distance sufficient to serve as a livestock feeding station.

* * * * *